US009686219B2

(12) United States Patent
Yan

(10) Patent No.: US 9,686,219 B2
(45) Date of Patent: Jun. 20, 2017

(54) SYSTEMS, METHODS, AND APPARATUSES FOR FACILITATING DETERMINATION OF A MESSAGE RECIPIENT

(75) Inventor: Zheng Yan, Espoo (FI)

(73) Assignee: Nokia Technologies Oy, Espoo (FI)

( * ) Notice: Subject to any disclaimer, the term of this patent is extended or adjusted under 35 U.S.C. 154(b) by 245 days.

(21) Appl. No.: 13/640,715

(22) PCT Filed: Apr. 14, 2010

(86) PCT No.: PCT/IB2010/051626
§ 371 (c)(1),
(2), (4) Date: Oct. 11, 2012

(87) PCT Pub. No.: WO2011/128726
PCT Pub. Date: Oct. 20, 2011

(65) Prior Publication Data
US 2013/0031196 A1 Jan. 31, 2013

(51) Int. Cl.
G06F 15/16 (2006.01)
H04L 12/58 (2006.01)

(52) U.S. Cl.
CPC ............ H04L 51/16 (2013.01); H04L 51/046 (2013.01); H04L 51/14 (2013.01)

(58) Field of Classification Search
CPC ..... H04L 51/04; H04L 12/581; H04L 12/586; H04L 51/36
USPC .......................................................... 709/206
See application file for complete search history.

(56) References Cited

U.S. PATENT DOCUMENTS

| 7,050,822 | B2 | 5/2006 | Nielsen et al. |
| 7,233,803 | B2 | 6/2007 | Nielsen et al. |
| 7,660,855 | B2 | 2/2010 | Arning et al. |
| 8,364,467 | B1 * | 1/2013 | Bowman ............. G06F 17/2765 707/708 |
| 2005/0223057 | A1 * | 10/2005 | Buchheit et al. ............. 709/203 |

(Continued)

FOREIGN PATENT DOCUMENTS

| EP | 1599862 A2 | 11/2005 |
| EP | 1966746 A2 | 9/2008 |

(Continued)

OTHER PUBLICATIONS

Tran et al., "The F@ Framework for Designing Awareness Mechanisms in Instant Messaging", Australasian Journal of Information Systems, vol. 13, Issue 2, May, 2006, pp. 119-134.

(Continued)

Primary Examiner — Liangche A Wang
Assistant Examiner — Ayele Woldemariam
(74) Attorney, Agent, or Firm — Mintz Levin Cohn Ferris Glovsky and Popeo, P.C.

(57) ABSTRACT

Methods and apparatuses are provided for facilitating determination of a message recipient. A method may include determining a message to be sent in one of multiple active messaging conversations. The method may further include determining a conversation to which the message is relevant from among the active messaging conversations based at least in part on data from historical conversations. The method may additionally include designating the message to be sent to at least one recipient. The at least one recipient may be a party participating in the determined conversation. Corresponding apparatuses are also provided.

14 Claims, 6 Drawing Sheets

(56) References Cited

U.S. PATENT DOCUMENTS

| | | | |
|---|---|---|---|
| 2006/0176831 | A1 | 8/2006 | Greenberg et al. |
| 2007/0201378 | A1 | 8/2007 | Tarkiainen et al. |
| 2008/0037733 | A1 | 2/2008 | Chen et al. |
| 2008/0080679 | A1* | 4/2008 | Fernandez et al. ........ 379/88.17 |
| 2008/0189367 | A1* | 8/2008 | Okumura .............. H04L 67/306 709/204 |
| 2008/0189374 | A1* | 8/2008 | Odell et al. ................... 709/206 |
| 2009/0063446 | A1 | 3/2009 | Ramamurthi |
| 2009/0111447 | A1 | 4/2009 | Nurmi |
| 2009/0313343 | A1* | 12/2009 | Brady et al. .................. 709/206 |

FOREIGN PATENT DOCUMENTS

| | | |
|---|---|---|
| EP | 2120408 A1 | 11/2009 |
| GB | 2435565 A | 8/2007 |
| WO | 2004/079530 A2 | 9/2004 |
| WO | WO-2005125070 A2 | 12/2005 |
| WO | 2007/072455 A2 | 6/2007 |

OTHER PUBLICATIONS

Shen et al., "Thread Detection in Dynamic Text Message Streams", Proceedings of the 29th annual international ACM SIGIR conference on Research and development in information retrieval, Aug. 6-11, 2006, pp. 35-42.

Wang et al., "Context-Based Message Expansion for Disentanglement of Interleaved Text Conversations", Proceedings of Human Language Technologies: The 2009 Annual Conference of the North American Chapter of the Association for Computational Linguistics, Jun. 2009, pp. 200-208.

Aoki et al., "The Mad Hatter's Cocktail Party: A Social Mobile Audio Space Supporting Multiple Simultaneous Conversations", Proceedings of the SIGCHI Conference on Human Factors in Computing Systems, vol. 5, Issue 1, Apr. 5-10, 2003, pp. 425-432.

Acar et al., "Modeling and Multiway Analysis of Chatroom Tensors", Proceedings of the 2005 IEEE international conference on Intelligence and Security Informatics, 2005, 13 pages.

O'Neill et al., "Text Chat in Action", Proceedings of the International ACM SIGGROUP conference on Supporting group work, Nov. 9-12, 2003, 10 pages.

Khoussainov at al., "Email Task Management: An Iterative Relational Learning Approach", Conference on Email and Anti-Spam, 2005, 8 pages.

Dredze et al., "Automatically Classifying Emails Into Activities", Proceedings of the 11th international conference on Intelligent user interfaces, Jan. 29-Feb. 1, 2006, pp. 70-77.

Allan et al., "Topic Detection and Tracking Pilot Study: Final Report", Proceedings of the DARPA Broadcast News Transcription and Understanding Workshop, Feb. 1998, 25 pages.

International Search Report and Written Opinion received for corresponding Patent Cooperation Treaty Application No. PCT/IB2010/051626, dated Dec. 14, 2010, 16 pages.

\* cited by examiner

SYSTEMS, METHODS, AND APPARATUSES FOR FACILITATING DETERMINATION OF A MESSAGE RECIPIENT

RELATED APPLICATION

This application was originally filed as PCT Application No. PCT/IB2010/051626 filed Apr. 14, 2010.

TECHNOLOGICAL FIELD

Embodiments of the present invention relate generally to communication technology and, more particularly, relate to systems, methods, and apparatuses for facilitating determination of a message recipient.

BACKGROUND

The modern computing era has brought about a tremendous expansion in computing power as well as increased affordability of computing devices. This expansion in computing power has led to a reduction in the size of computing devices and given rise to a new generation of mobile devices that are capable of performing a wide range of functionalities. Consequently, mobile computing devices having a small form factor are becoming increasingly ubiquitous and are used by users of all socioeconomic backgrounds for a wide variety of purposes.

These evolved mobile computing devices allow users to take advantage of networking technologies, which facilitate information transfer and communication between users of computing devices. In this regard, many users frequently use mobile computing devices for engaging in messaging conversations with users of other computing devices. Some users even engage in multiple concurrent conversations.

BRIEF SUMMARY

Systems, methods, apparatuses, and computer program products described herein facilitate determination of a message recipient. The systems, methods, apparatuses, and computer program products provided in accordance with example embodiments of the invention may provide several advantages to computing devices, network providers, and computing device users. Some example embodiments determine to which of a plurality of active messaging conversations a message to be sent is relevant. Some such example embodiments determine which active messaging conversation a message is relevant to based at least in part upon data from historical conversations. Accordingly, some example embodiments enable determination of an appropriate recipient of a message by determining the conversation to which the message is relevant and designating the message to be sent to a recipient that is a party participating in the determined conversation. In this regard, some example embodiments utilize word correlation, such as based on one or more relevant word-to-word translation pairs accumulated from past messaging conversations, to calculate a semantic relevance between a message and an active conversation to facilitate determination of a target message recipient.

Users may particularly benefit from some example embodiments because a user may be able to enter messages to be sent in one of a plurality of active conversations without having to switch among different conversation windows. In this regard, in some example embodiments, a user may enter a message to be sent without designating a recipient for the message and the recipient may be determined by determining the conversation from among the plurality of active conversations to which the message has the greatest degree of relevance. Users may therefore benefit by not having to enter key strokes, mouse clicks, and/or other user input required to switch between active conversation windows to enter a message in a particular conversation window. Users may further benefit because some example embodiments may reduce the potential of a message being sent to the wrong recipient due to a user error resulting in a message being entered into a wrong conversation window. Network providers may benefit because some example embodiments may reduce the amount of excess data transfer that may occur if a user sends a message to an unintended recipient and then has to resend the message to the intended recipient. Some example embodiments may be easily and flexibly integrated into existing messaging applications and thus may be flexibly and rapidly deployed to improve the messaging experience of users of a variety of messaging platforms.

In a first example embodiment, a method is provided, which comprises determining a message to be sent in one of a plurality of active messaging conversations. The method of this embodiment further comprises determining a conversation to which the message is relevant from among the active messaging conversations based at least in part on data from historical conversations. The method of this embodiment additionally comprises designating the message to be sent to at least one recipient, wherein the at least one recipient comprises a party participating in the determined conversation.

In another example embodiment, an apparatus is provided. The apparatus of this embodiment comprises at least one processor and at least one memory storing computer program code, wherein the at least one memory and stored computer program code are configured, with the at least one processor, to cause the apparatus to at least determine a message to be sent in one of a plurality of active messaging conversations. The at least one memory and stored computer program code are configured, with the at least one processor, to further cause the apparatus of this embodiment to determine a conversation to which the message is relevant from among the active messaging conversations based at least in part on data from historical conversations. The at least one memory and stored computer program code are configured, with the at least one processor, to additionally cause the apparatus of this embodiment to designate the message to be sent to at least one recipient, wherein the at least one recipient comprises a party participating in the determined conversation.

In another example embodiment, a computer program product is provided. The computer program product of this embodiment includes at least one computer-readable storage medium having computer-readable program instructions stored therein. The program instructions of this embodiment comprise program instructions configured to determine a message to be sent in one of a plurality of active messaging conversations. The program instructions of this embodiment further comprise program instructions configured to determine a conversation to which the message is relevant from among the active messaging conversations based at least in part on data from historical conversations. The program instructions of this embodiment also comprise program instructions configured to designate the message to be sent to at least one recipient, wherein the at least one recipient comprises a party participating in the determined conversation.

In another example embodiment, an apparatus is provided that comprises means for determining a message to be sent in one of a plurality of active messaging conversations. The apparatus of this embodiment further comprises means for determining a conversation to which the message is relevant from among the active messaging conversations based at least in part on data from historical conversations. The apparatus of this embodiment additionally comprises means for designating the message to be sent to at least one recipient, wherein the at least one recipient comprises a party participating in the determined conversation.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
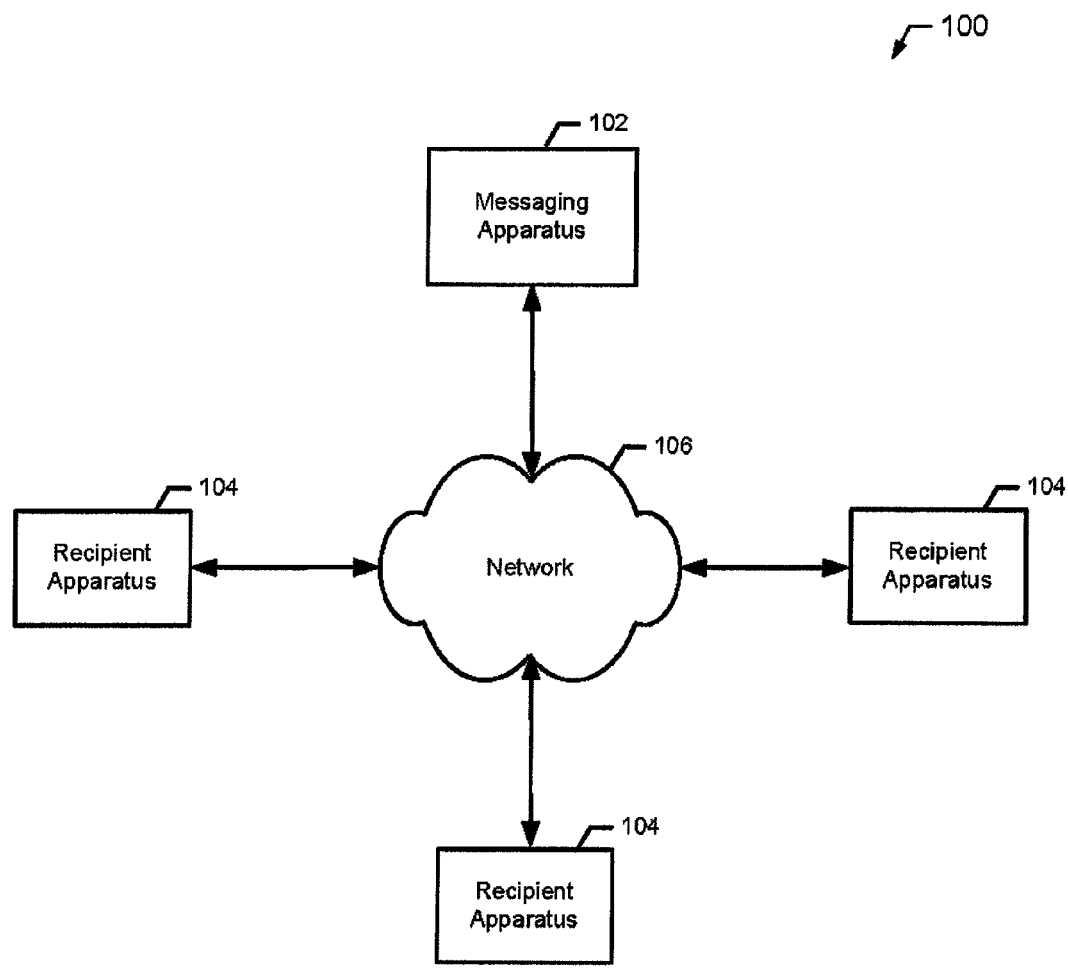
FIG. 1 illustrates a block diagram of a system for facilitating determination of a message recipient according to an example embodiment of the invention.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Computing device users frequently use their computing devices to communicate with other users via messaging conversations. These messaging conversations may include any form of electronic messaging by which two or more parties may exchange text-based messages, graphics, data, and/or the like. Messaging conversations may be facilitated through use of any of a variety of electronic messaging types. One example of a messaging type that is widely used is instant messaging. Accordingly, instant messaging is used herein as an example to facilitate description of some example embodiments. It will be appreciated, however, that example embodiments may be applied to other messaging types used for engaging in messaging conversations, including, for example, electronic mail, text messaging, a conversation via multimedia messaging service (MMS) messaging, a conversation via short message service (SMS) messaging, twitter feed, microblog, internet relay chat, online chat, chat rooms, message board threads, community conversations having more than two parties, and/or the like. Further, it will be appreciated that messaging conversations are not strictly limited to text-based messaging. In this regard, a messaging conversation may comprise exchange of text content, graphic content, multimedia content, some combination thereof, or the like between users engaged in a messaging conversation. Thus, where instant messaging is referred to herein it is merely by way of example and not by way of limitation to a particular messaging type.

When talking with several people simultaneously via instant messaging, a user often is required to maintain multiple two-party conversation windows (for example, a conversation window for each person with which the user is engaged in a conversation), and switch among them during the messaging conversations. This arrangement may not be convenient to users in practice. Users may be inconvenienced by having to provide user input to switch between windows when engaged in the messaging conversation. Further, users often mistakenly type a message intended for a recipient participating in a first conversation in a conversation window for a second conversation.

Accordingly, some example embodiments may improve user experience when engaging in multiple messaging conversations by facilitating determination of a message recipient. Referring now to FIG. 1, FIG. 1 illustrates a block diagram of a system 100 for facilitating determination of a message recipient according to an example embodiment. It will be appreciated that the system 100 as well as the illustrations in other figures are each provided as an example of one embodiment of the invention and should not be construed to narrow the scope or spirit of the invention in any way. In this regard, the scope of the disclosure encompasses many potential embodiments in addition to those illustrated and described herein. As such, while FIG. 1 illustrates one example of a configuration of a system for facilitating determination of a message recipient, numerous other configurations may also be used to implement embodiments of the present invention.

In at least some embodiments, the system 100 includes a messaging apparatus 102 and a plurality of recipient apparatuses 104. The messaging apparatus 102 and recipient apparatuses 104 may be configured to engage in messaging conversations over the network 106. The network 106 may comprise a wireless network (for example, a cellular network, wireless local area network, wireless personal area network, wireless metropolitan area network, and/or the like), a wireline network, or some combination thereof, and in some embodiments comprises at least a portion of the Internet. As another example, the network 106 may comprise an ad hoc network formed between a messaging apparatus 102 and one or more recipient apparatuses 104. Such an ad hoc network may be formed, for example, through wireless communication between the messaging apparatus 102 and one or more recipient apparatuses 104. The wireless communication may, for example, be accommodated through device-to-device communication means, such as Bluetooth, infrared communications, communications in accordance with an Institute of Electrical and Electronics Engineers (IEEE) 802.11 standard, an ad-hoc wireless local area network (WLAN), wireless personal area network (WPAN), some other radio frequency communication, and/or the like.

The messaging apparatus 102 may be embodied as any computing device, such as, for example, a desktop computer, laptop computer, mobile terminal, mobile computer, mobile phone, mobile communication device, game device, digital camera/camcorder, audio/video player, television device, radio receiver, digital video recorder, positioning device, wrist watch, portable digital assistant (PDA), any combination thereof, and/or the like. In this regard, the messaging apparatus 102 may be embodied as any computing device configured to implement a messaging conversation application and provide a user interface allowing a user to enter messages for sending to a party participating in a messaging conversation, such as to a user of a recipient apparatus 104.

As another example, the messaging apparatus 102 may be embodied as one or more servers, one or more desktop computers, one or more laptop computers, one or more mobile computers, one or more network nodes, multiple computing devices in communication with each other, any combination thereof, and/or the like. In this regard, the messaging apparatus 102 may be configured to provide a messaging service that a user of a remote computer may access over a network, such as the network 106 to facilitate engagement in messaging conversations with other users. For example, in such embodiments the messaging apparatus 102 may be configured to provide a messaging web service enabling a user of a remote computing device to access an online messaging application over the network 106 to enable the user to engage in messaging conversations with users of recipient apparatuses 104.

A recipient apparatus 104 may be embodied as any computing device, such as, for example, a desktop computer, laptop computer, server, mobile terminal, mobile computer, mobile phone, mobile communication device, game device, digital camera/camcorder, audio/video player, television device, radio receiver, digital video recorder, positioning device, wrist watch, portable digital assistant (PDA), any combination thereof, and/or the like. In this regard, the data processing apparatus 104 may comprise any computing device configured to engage in a messaging conversation with a user of a messaging apparatus 102 over the network 106. Accordingly, a recipient apparatus 104 may be configured to receive a message sent by the messaging apparatus 102 and to send a message to the messaging apparatus 102.

It will be appreciated that although the messaging apparatus 102 and recipient apparatus 104 are illustrated and described as distinct entities, such labeling and description is merely to facilitate description of various example embodiments. In this regard, a messaging apparatus 102 may be configured to function as a recipient apparatus in order to receive messages sent by a recipient apparatus 104 in a messaging conversation. Similarly, a recipient apparatus 104 may be configured to function as a messaging apparatus in order to send a message to a messaging apparatus 102 in a messaging conversation.

Figure 2:
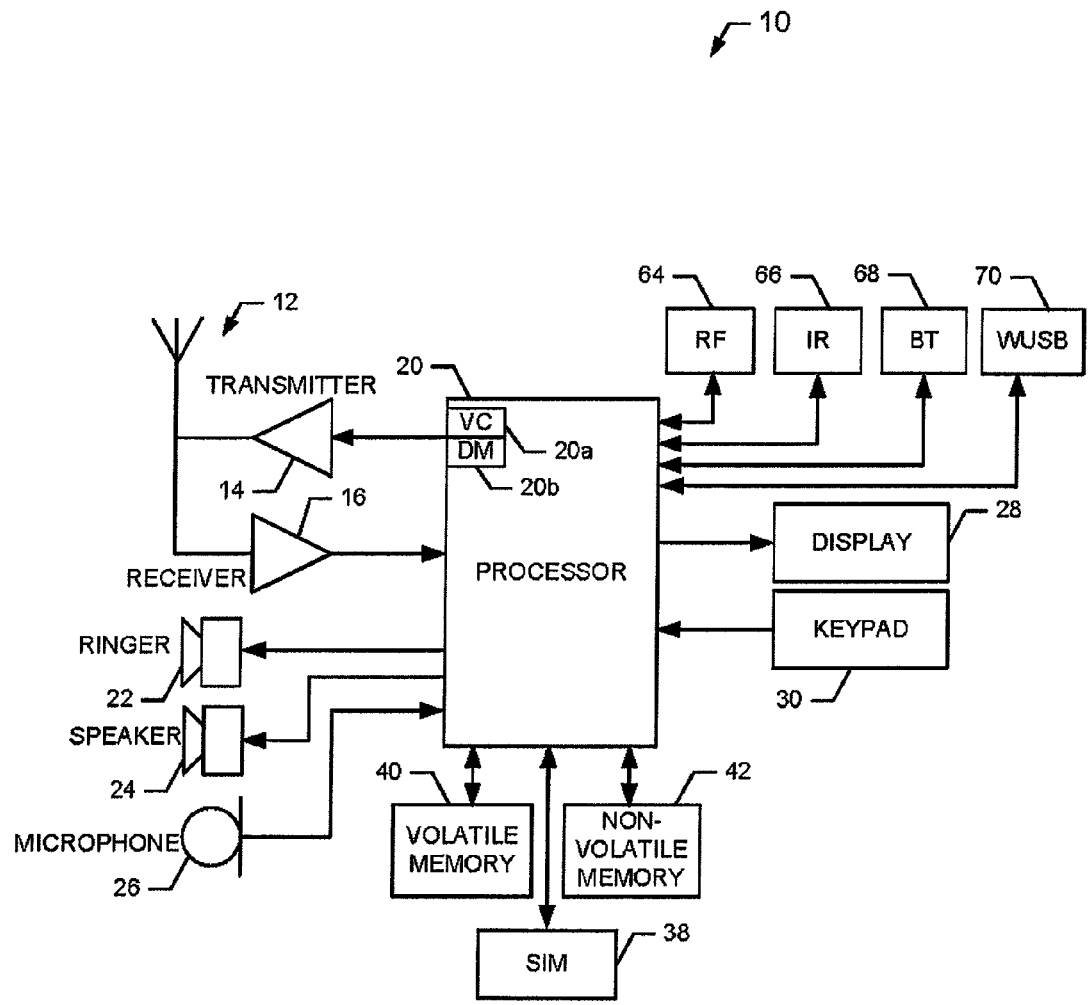
FIG. 2 is a schematic block diagram of a mobile terminal according to an example embodiment of the invention.

In an example embodiment, the messaging apparatus 102 and/or recipient apparatus 104 are embodied as a mobile terminal, such as that illustrated in FIG. 2. In this regard, FIG. 2 illustrates a block diagram of a mobile terminal 10 representative of one embodiment of a messaging apparatus 102 and/or recipient apparatus 104 in accordance with embodiments of the present invention. It should be understood, however, that the mobile terminal 10 illustrated and hereinafter described is merely illustrative of one type of messaging apparatus 102 and/or recipient apparatus 104 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wireless Fidelity (Wi-Fi) or Worldwide Interoperability for Microwave Access (Wi-MAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, IEEE 802.15 techniques, IEEE 802.16 techniques, and/or the like.

The mobile terminal 10 may comprise memory, such as a subscriber identity module (SIM) 38, a universal subscriber identity module (USIM), a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
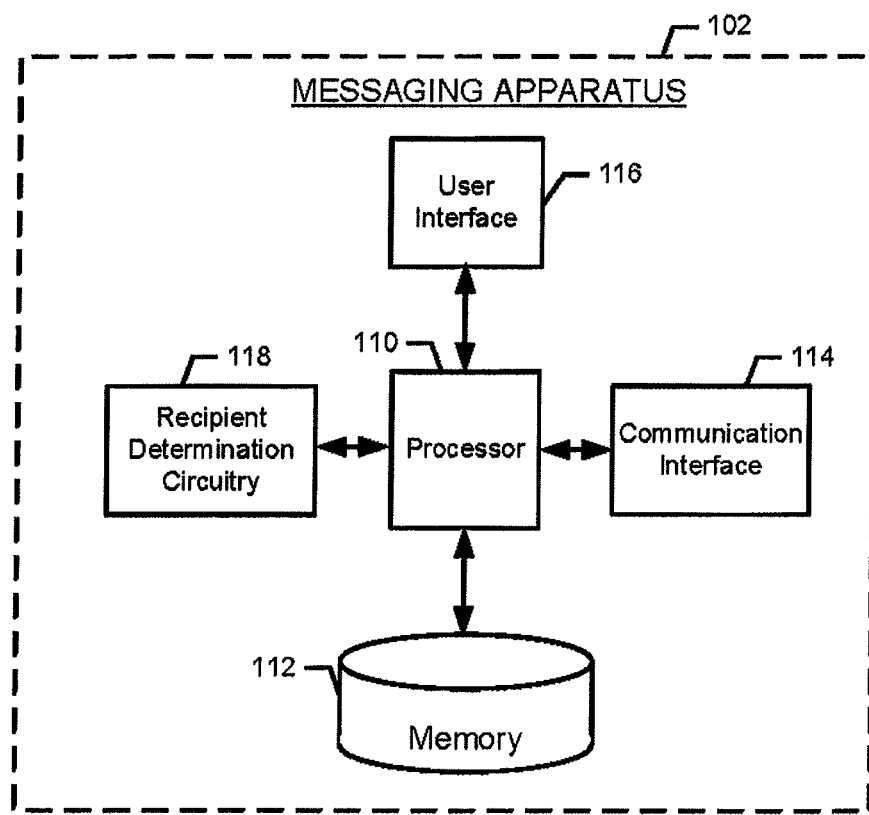
FIG. 3 illustrates a block diagram of a messaging apparatus for facilitating determination of a message recipient according to an example embodiment of the invention.

Referring now to FIG. 3, FIG. 3 illustrates a block diagram of a messaging apparatus 102 for facilitating determination of a message recipient according to an example embodiment of the invention. It will be appreciated that a recipient apparatus 104 may similarly comprise one or more of the elements illustrated in and described with respect to FIG. 3. In the example embodiment illustrated in FIG. 3, the messaging apparatus 102 may include various means, such as one or more of a processor 110, memory 112, communication interface 114, user interface 116, or recipient determination circuitry 118 for performing the various functions herein described. These means of the messaging apparatus 102 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example, memory 112) that is executable by a suitably configured processing device (for example, the processor 110), or some combination thereof.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some embodiments the processor 110 comprises a plurality of processors. The plurality of processors may be in operative communication with each other and may be collectively configured to perform one or more functionalities of the messaging apparatus 102 as described herein. The plurality of processors may be embodied on a single computing device or may be distributed across a plurality of computing devices collectively comprising the messaging apparatus 102. In embodiments wherein the messaging apparatus 102 is embodied as a mobile terminal 10, the processor 110 may be embodied as or comprise the processor 20. In an example embodiment, the processor 110 is configured to execute instructions stored in the memory 112 or otherwise accessible to the processor 110. These instructions, when executed by the processor 110, may cause the messaging apparatus 102 to perform one or more of the functionalities of the messaging apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. Although illustrated in FIG. 3 as a single memory, the memory 112 may comprise a plurality of memories. The plurality of memories may be embodied on a single computing device or on a plurality of computing devices collectively comprising the messaging apparatus 102. In various embodiments, the memory 112 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the messaging apparatus 102 is embodied as a mobile terminal 10, the memory 112 may comprise the volatile memory 40 and/or the non-volatile memory 42. The memory 112 may be configured to store information, data, applications, instructions, or the like for enabling the messaging apparatus 102 to carry out various functions in accordance with example embodiments of the present invention. For example, in at least some embodiments, the memory 112 is configured to buffer input data for processing by the processor 110. Additionally or alternatively, in at least some embodiments, the memory 112 is configured to store program instructions for execution by the processor 110. The memory 112 may store information in the form of static and/or dynamic information. The stored information may, for example, comprise key word pairs, such as may be stored in a database. This stored information may be stored and/or used by the recipient determination circuitry 118 during the course of performing its functionalities.

The communication interface 114 may be embodied as any device or means embodied in circuitry, hardware, a computer program product comprising computer readable program instructions stored on a computer readable medium (for example, the memory 112) and executed by a processing device (for example, the processor 110), or a combination thereof that is configured to receive and/or transmit data from/to an entity of the system 100, such as, for example, a recipient apparatus 104. In at least one embodiment, the communication interface 114 is at least partially embodied as or otherwise controlled by the processor 110. The communication interface 114 may, for example, be in communication with the processor 110, such as via a bus. The communication interface 114 may include, for example, an antenna, a transmitter, a receiver, a transceiver and/or supporting hardware or software for enabling communications with one or more entities of the system 100. The communication interface 114 may be configured to receive and/or transmit data using any protocol that may be used for communications between entities of the system 100. The communication interface 114 may additionally be in communication with the memory 112, user interface 116, and/or recipient determination circuitry 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In this regard, the user interface 116 may provide means to allow a user to enter a message to be sent to a recipient. The user interface 116 may further provide means for a user to view a message received from a recipient apparatus 104. In embodiments wherein the messaging apparatus 102 is embodied as one or more servers, aspects of the user interface 116 may be reduced or the user interface 116 may even be eliminated. In such embodiments wherein aspects of the user interface 116 are reduced or eliminated, user interface elements allowing a user to enter a message to be sent to a recipient apparatus 104 and view messages received from a recipient apparatus 104 may instead be embodied on a remote user terminal configured to access messaging services provided by the messaging apparatus 102 over the network 106. The user interface 116 may be in communication with the memory 112, communication interface 114, and/or recipient determination circuitry 118, such as via a bus.

The recipient determination circuitry 118 may be embodied as various means, such as circuitry, hardware, a computer program product comprising computer readable program instructions stored on a computer readable medium (for example, the memory 112) and executed by a processing device (for example, the processor 110), or some combination thereof and, in one embodiment, is embodied as or otherwise controlled by the processor 110. In embodiments wherein the recipient determination circuitry 118 is embodied separately from the processor 110, the recipient determination circuitry 118 may be in communication with the processor 110. The recipient determination circuitry 118 may further be in communication with one or more of the memory 112, communication interface 114, or user interface 116, such as via a bus.

In some example embodiments, the recipient determination circuitry 118 is configured to determine a message to be sent in one of a plurality of active messaging conversations. In this regard, a user may enter a message for transmission in one of a plurality of messaging conversations in which the user is engaged. Accordingly, a message to be sent in a messaging conversation may be intended to be sent to one or more parties participating in the conversation. The recipient determination circuitry 118 may be configured to use data from historical conversations to determine a conversation to which the message is relevant from among the active messaging conversations.

The data from historical conversations may, for example, comprise semantic relations between key words extracted from historical messaging conversations. In this regard, the data from historical conversations may be generated through analysis of historical conversations by a semantic word model configured to determine key word pairs binding two or more messages within a particular conversation as being related. Accordingly, the semantic relations may comprise key word pairs. A key word pair may comprise a pair of words determined to be related through analysis of historical conversations. In this regard, where a first key word in a key word pair appears in a first message and a second key word in a key word pair appears in a second message, there may be some likelihood that the first and second message are relevant to each other, such that they may belong in the same conversation.

As previously discussed, a messaging conversation is not limited to strictly text-based messaging. Accordingly, it will be appreciated that a word is not limited to a textual word recognized in a written language. In this regard, a word may comprise any kind of media unit utilized for various types of messaging. By way of example, a word may comprise a series of characters (e.g., a portion of a textual word), a plurality of words (e.g., a phrase), a sentence, a sentence fragment, multimedia content, an image, image data, a video frame, video data, a video clip, audio data, audio clip, an emoticon, other media unit, and/or the like. Accordingly, a key word pair may comprise any pairing of related media units.

When determining a conversation to which a message is relevant, the recipient determination circuitry 118 may be configured to iteratively select a conversation from a subset of the active messaging conversations and compare the content of the message to each of a subset of the previous messages in the selected conversations. In this regard, semantic key word data extracted from historical conversations may be used to determine whether there is a correlation between the message and one or more previous messages in an active conversation. In this regard, the message may be relevant to an active conversation if there is a correlation between the message and one or more previous messages in the active conversation.

In some example embodiments, the recipient determination circuitry 118 is configured to consider temporal information in addition to data from historical conversations when determining a conversation to which a message is relevant. The temporal information may comprise an interval between a message to be sent and a last received and/or sent message in an active conversation. In this regard, messages spaced closer in time may be more relevant to each other. Thus, for example, if a last message in a first conversation has a larger temporal gap to a message to be sent than a last message in a second conversation, the second conversation may be more relevant to the message to be sent.

In some example embodiments, the recipient determination circuitry 118 is configured to determine a degree of relevance of a message to be sent to each of a subset of the plurality of active messaging conversations. The recipient determination circuitry 118 may calculate a degree of relevance of a message to be sent to an active conversation based on any number of factors including. Example factors that may affect the degree of relevance of a message to a conversation include the temporal relationship of the message to the conversation, a number of semantic key word pairs found in a comparison of the message to one or more previous messages in the conversation, and/or the like. The recipient determination circuitry 118 may determine the active messaging conversation having the greatest degree of relevance to the message to be sent to be the conversation to which the message is relevant from among the active messaging conversations.

The recipient determination circuitry 118 may be further configured to designate a message to be sent to at least one recipient (for example, recipient apparatus 104) that is a party participating in the active conversation determined to be relevant (for example, most relevant) to the message. The number of designated recipients may depend on the number of parties to the relevant messaging conversation. For example, if the relevant messaging conversation is a two-party messaging conversation (e.g., a conversation to which the messaging apparatus 102 and a single recipient apparatus 104 are parties), a single recipient may be designated. If, however, the messaging conversation has more than two parties (e.g., a conversation to which the messaging apparatus 102 and a plurality of recipient apparatuses 104 are parties), such as a community chat conversation, the recipient determination circuitry 118 may designate multiple recipients.

In various embodiments, designating a message to be sent to a recipient may comprise automatically sending the message to the recipient and/or may comprise suggesting the recipient as the intended recipient to a user and requesting user confirmation before sending the message to the designated recipient. In embodiments wherein the recipient determination circuitry 118 is configured to calculate a degree of relevance of an active conversation to a message to be sent, the recipient determination circuitry 118 may be configured to automatically cause the message to be sent to a designated recipient when the degree of relevance of the message to the determined conversation meets a predefined threshold degree of relevance. When the relevance of the message to the determined conversation does not meet a predefined threshold degree of relevance, however, the recipient determination circuitry 118 may be configured to cause the determined conversation to be suggested to a user and seek user confirmation that the designated recipient is the user-intended recipient prior to sending the message.

Figure 4:
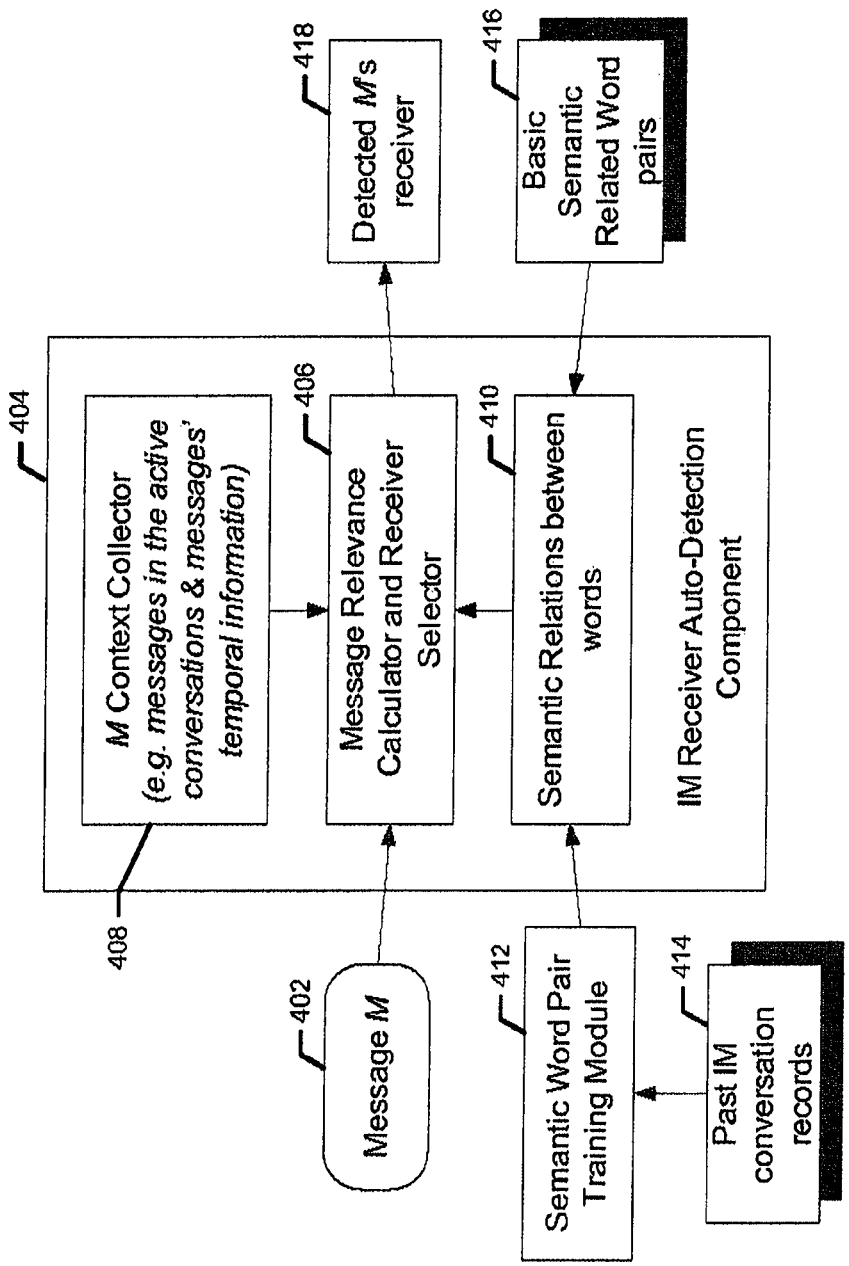
FIG. 4 illustrates an example model for determining a message recipient according to an example embodiment of the invention.

FIG. 4 illustrates an example model that may be used by the recipient determination circuitry 118 for determining a message recipient according to an example embodiment of the invention. More particularly, FIG. 4 illustrates an example model for determining a recipient of an instant message according to an example embodiment. It will be appreciated, however, that the model illustrated in and described with respect to FIG. 4 may be modified to apply to messaging conversations other than instant messaging conversations. Referring now to FIG. 4, the recipient determination circuitry 118 may utilize an instant message (IM) receiver auto-detection model 404 to determine which of a plurality of active instant messaging conversations a message 402 (for example, a message to be sent) is related. Accordingly, in an example embodiment, the recipient determination circuitry 118 comprises and/or is configured to implement the elements of the model 404. In this regard, the model 404 may comprise a message relevance calculator and receiver selector 406. The message relevance calculator and receiver selector 406 may be configured to access previous messages and temporal information from active conversations ("active conversation data 408") for purposes of analysis and comparison with the message 402. In this regard, the message relevance calculator and receiver selector 406 may be configured to utilize stored semantic relations between words 410 ("semantic relations 410") to analyze and compare the message 402 to the active conversation data 408.

The semantic relations 410 may comprise a set of basic semantic related word pairs 416 and/or a set of semantic related word pairs generated by a semantic word pair training module 412 from past instant messaging conversation records 414. The set of basic semantic related word pairs 416 may, for example, comprise seed data used to initialize the model 404 to enable determination of a recipient for a message prior to collection of any messaging conversations. Accordingly, accuracy of the model 404 may be improved with continued use as additional messaging conversation records are collected and used for generation of semantic relations between words to supplement the basic semantic related word pairs 416

The message relevance calculator and receiver selector 406 may use the semantic relations 410 and the active conversation data 408 to calculate a degree of relevance of each active conversation in a subset of the active conversations to the message 402. The active conversation having the greatest calculated degree of relevance to the message 402 may be determined to be the conversation to which the message 402 is relevant and one or more recipient apparatuses 104 that are parties participating in the determined conversation may be designated as the receiver 418 of the message 402.

An example algorithm that may be used by the recipient determination circuitry 118 to determine a conversation to which a message is relevant may be described as follows:

Input: ConvSet: Set of the active conversations, $C_1, C_2, ..., C_n$
M: Current message typed by a messaging user
Output: the most relevant Conversation to M, say ConvRel
(1) MsgRel= NULL
(2) FOR EACH conversation C ∈ ConvSet
(3)     FOR EACH message m ∈ C
(4)         IF MsgRel == NULL or Rel(M|m) > Rel(M|MsgRel)
(5)             MsgRel=m
(6)         END of IF
(7)     END of FOR
(8) END of FOR
(9) Let ConvRel be the conversation that MsgRel belongs to
(10) RETURN ConvRel In this example algorithm, Rel(M|m) is the function used to calculate the relevance between M (for example, the message to be sent) and m (for example, a previous message in an active conversation) based on semantic word pairs and message's temporal factor. As a reference, an example concrete function may be defined as:

$$Rel(M|m) = \Pi_{q \in M} P(q|m) \quad [1],$$

where q is a word in M and P(q|m) is the probability of generating q from m based on the set of semantic related word pairs.

To avoid zero probabilities, linear interpolation may be used to smooth equation [1] as:

$$P(q|m) = (1-\lambda)\Sigma_{w \in m} \text{tran}(q|w) P_{ml}(w|m) + \lambda P_{ml}(q|D) \quad [2],$$

where w is a word in m, and where tran(q|w) denotes the probability that word q is the translation of word w. D denotes the whole conversation collection. Suppose |D| and |m| are the total number of words in D and m, respectively. If tf(w,m) denotes the frequency of word w in m, tf(q,D) denotes the frequency of word q in D, then $P_{ml}(w|m)$=tf(w,m)/|m|, $P_{ml}(q|D)$=tf(q,D)/|D|. Using $P_{ml}(q|D)$, zero probabilities may be avoided. λ is a smoothing parameter, (for example 0.8). Given an assumption that tran(w|w)=1, the probability of self translation is always 1.

Based on equation [1], equation [3] for calculating the relevance between an incoming message and an active conversation by considering the message's temporal factor may be obtained:

$$Rel(M|C) = \max_{i=1}^{k} e^{-\frac{(dist(M,m_i))^2}{\alpha}} \quad [3]$$

$$Rel(M|m_i) = \max_{i=1}^{k} e^{-\frac{(dist(M,m_i))^2}{\alpha}} \Pi_{q \in M} Rel(q|m_i),$$

where k denotes the number of previous messages in C (one active conversation), $m_i$ is the $i^{th}$ message in C, and dist(M, $m_i$) denotes the time distance between M and $m_i$, in seconds. Considering the user may take part in several conversations and cannot reply to every conversation quickly, the user's messages may not be too close in time in each conversation.

$$e^{-\frac{(dist(M,m_i))^2}{\alpha}} \sqrt{dist(M, m_i)}$$

may be applied to limit the influence of time, where α>0 (for example, α=2) is a parameter to control the temporal factor's influence.

The recipient determination circuitry 118 may be further configured to update stored data from historical conversations with data from an active conversation. In this regard, the recipient determination circuitry 118 may be configured to extract semantic key word pairs from an active conversation in order to update the extracted historical data. The recipient determination circuitry 118 may, for example, update the data from historical conversations with data from an active conversation upon completion (for example, termination) of the active conversation. As another example, the recipient determination circuitry 118 may update the data from historical conversations with data from an active conversation as messages are exchanged in the active conversation. As a further example, conversations may be at least temporarily archived in a message archive. Accordingly, the recipient determination circuitry 118 may be configured to periodically update the data from historical conversations with data from the message archive.

It will be appreciated that example embodiments described herein may be used in conjunction with a variety of messaging types and integrated into a variety of messaging interfaces. As one example, a common window or entry form may be provided for user entry of messages to be sent. Accordingly, even when a user is engaged in a plurality of messaging conversations, the user may enter all messages to be sent, regardless of the intended recipient, in a common message entry form. The recipient determination circuitry 118 may determine a conversation to which the message is relevant and designate the message to be sent to a recipient that is party participating in the determined conversation. In this regard, a user may not have to switch between several message entry windows in order to enter a message and have the message sent to an intended recipient.

As another example, each messaging conversation may be displayed in a separate window including a dedicated message entry form for entering messages to be sent in that conversation. The recipient determination circuitry 118 may be configured to verify that a message entered into the message entry form for a particular conversation is relevant to the conversation prior to sending the message to a recipient that is a party participating in the conversation. In this regard, if the recipient determination circuitry 118 determines that the message to be sent is not related to the conversation to which it is entered by the user, but rather is relevant to another active conversation, the recipient determination circuitry 118 may be configured to notify the user of a potential entry error and/or send the message in the correct conversation so as to reduce the risk of user error.

Figure 5:
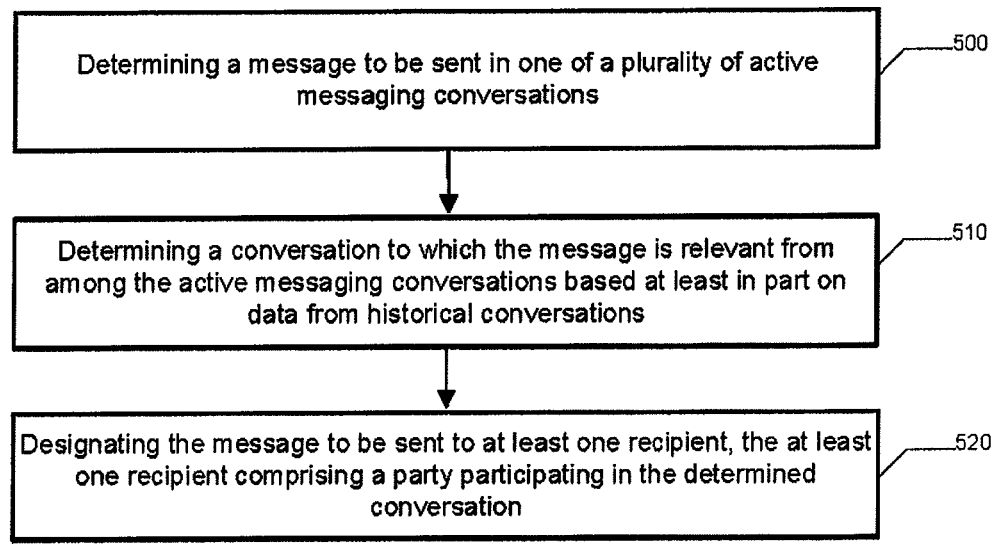
FIG. 5 illustrates a flowchart according to an example method for facilitating determination of a message recipient according to an example embodiment of the invention.

FIG. 5 illustrates a flowchart according to an example method for facilitating determination of a message recipient according to an example embodiment of the invention. The operations illustrated in and described with respect to FIG. 5 may, for example, be performed by, with the assistance of, and/or under control of one or more of the processor 110, memory 112, communication interface 114, user interface 116, or recipient determination circuitry 118. Operation 500 may comprise determining a message to be sent in one of a plurality of active messaging conversations. Operation 510 may comprise determining a conversation to which the message is relevant from among the active messaging conversations based at least in part on data from historical conversations. Operation 520 may comprise designating the message to be sent to at least one recipient. The at least one designated recipient may comprise at least one party (e.g., a recipient device 104 and/or user thereof) participating in the conversation determined in operation 510.

Figure 6:
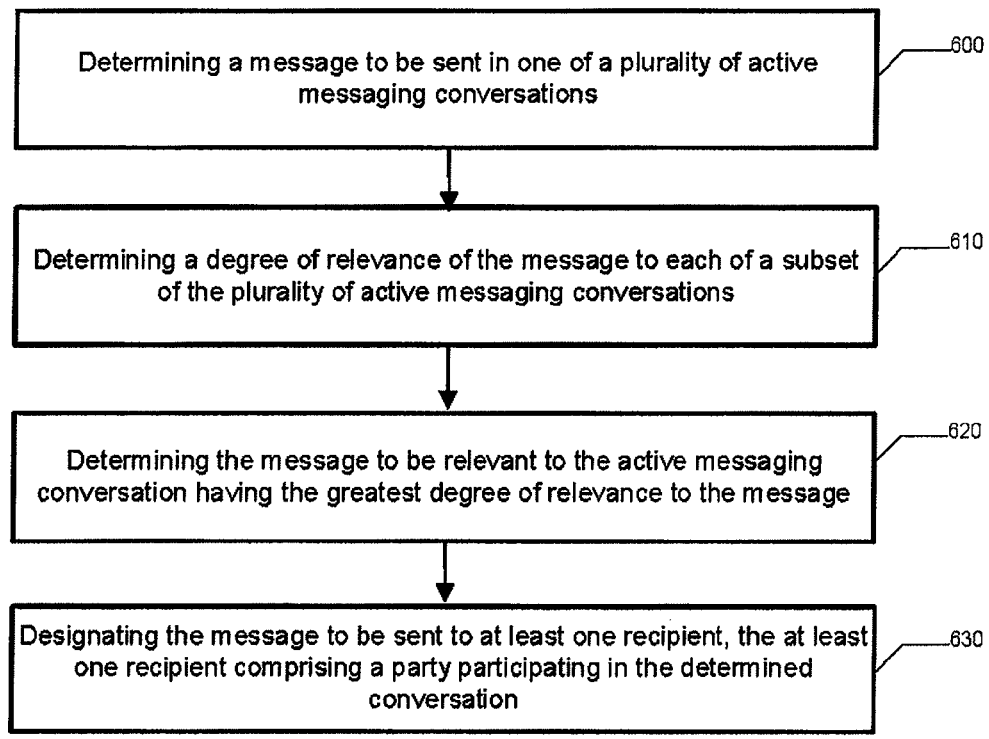
FIG. 6 illustrates a flowchart according to an example method for facilitating determination of a message recipient according to an example embodiment of the invention.

FIG. 6 illustrates a flowchart according to an example method for facilitating determination of a message recipient according to an example embodiment of the invention. \ The operations illustrated in and described with respect to FIG. 6 may, for example, be performed by with the assistance of, and/or under control of one or more of the processor 110, memory 112, communication interface 114, user interface 116, or recipient determination circuitry 118. Operation 600 may comprise determining a message to be sent in one of a plurality of active messaging conversations. Operation 610 may comprise determining a degree of relevance of the message to each of a subset of the plurality of active messaging conversations. Operation 620 may comprise determining the message to be relevant to the active messaging conversation having the greatest degree of relevance to the message. Operation 630 may comprise designating the message to be sent to at least one recipient. The at least one designated recipient may comprise at least one party (e.g., a recipient device 104 and/or user thereof) participating in the conversation determined in operation 620.

FIGS. 5-6 are flowcharts of a system, method, and computer program product according to example embodiments of the invention. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device and executed by a processor in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories (for example, memory 112) on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, the messaging apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention provide several advantages to computing devices, network providers, and computing device users. Some example embodiments determine to which of a plurality of active messaging conversations a message to be sent is relevant. Some such example embodiments determine which active messaging conversation a message is relevant to based at least in part upon data from historical conversations. Accordingly, some example embodiments enable determination of an appropriate recipient of a message by determining the conversation to which the message is relevant and designating the message to be sent to a recipient that is a party participating in the determined conversation. In this regard, some example embodiments utilize word correlation, such as based on one or more relevant word-to-word translation pairs accumulated from past messaging conversations, to calculate a semantic relevance between a message and an active conversation to facilitate determination of a target message recipient.

Users may particularly benefit from some example embodiments because a user may be able to enter messages to be sent in one of a plurality of active conversations without having to switch among different conversation windows. In this regard, in some example embodiments, a user may enter a message to be sent without designating a recipient for the message and the recipient may be determined by determining the conversation from among the plurality of active conversations to which the message has the greatest degree of relevance. Users may therefore benefit by not having to enter key strokes, mouse clicks, and/or other user input required to switch between active conversation windows to enter a message in a particular conversation window. Users may further benefit because some example embodiments may reduce the potential of a message being sent to the wrong recipient due to a user error resulting in a message being entered into a wrong conversation window. Network providers may benefit because some example embodiments may reduce the amount of excess data transfer that may occur if a user sends a message to an unintended recipient and then has to resend the message to the intended recipient. Some example embodiments may be easily and flexibly integrated into existing messaging applications and thus may be flexibly and rapidly deployed to improve the messaging experience of users of a variety of messaging platforms.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
   determining a message that is to be sent by a sender, wherein the sender is engaged in a plurality of active messaging conversations;
   identifying, in the message, a first key word that is related to a second key word found in another message, wherein the other message was sent in one of the plurality of conversations, wherein the first key word is identified as being related to the second key word, when the first key word and the second key word comprise a keyword pair, and wherein the key word pair is determined based at least on data from historical conversations;
   determining the message and the other message are both associated with the one of the plurality of conversations, wherein the determining comprises determining a relevance value corresponding to a degree of relevance of the message and the other message, wherein the relevance value is determined based at least on a quantity of key word pairs present in the message and the other message, a time interval between the message and the other message, and a probability associated with the keyword pair, and wherein the probability indicates a likelihood that a first message that includes the first key word is relevant to a second message that contains the second key word;
   determining the message is to be sent to at least one recipient, wherein the at least one recipient comprises a party participating in the one of the plurality of conversations;
   providing, to the sender, a suggestion to send the message to the at least one recipient, when the relevance value is less than a threshold value; and
   updating, based at least on the message being associated with the one of the plurality of conversations, the data from the historical conversations.

2. The method of claim 1, wherein the data from the historical conversations comprises semantic relations between key words extracted from the historical conversations.

3. The method of claim 2, wherein the key words comprise at least one of a textual word, a series of characters, a plurality of words, a sentence, a sentence fragment, multimedia content, an image, image data, a video frame, video data, a video clip, audio data, audio clip, or an emoticon.

4. The method of claim 1, further comprising:
   selecting the one of the plurality of conversations; and
   comparing a content of the message to the other message to at least determine whether the second key word appears in the other message.

5. The method of claim 1, further comprising:
sending, to the at least one recipient, the message, when the relevance value is greater than or equal to a predefined threshold value.

6. The method of claim 1, wherein the determining of the relevance value is further based at least on a temporal factor comprising a difference in time between the message and the other message.

7. The method of claim 1, wherein the updating includes adding, to the data from the historical conversations, another key word pair, wherein the other key word pair includes the first key word or a third key word from the message, and wherein the other key word pair further includes a fourth key word from the other message.

8. An apparatus comprising: at
least one processor; and
at least one memory storing computer program code, the at least one memory, the computer program code, and the at least one processor configured to cause the apparatus to at least:
determine a message that is to be sent by a sender, wherein the sender is engaged in a plurality of active messaging conversations;
identify, in the message, a first key word that is related to a second key word found in another message, wherein the other message was sent in one of the plurality of conversations, wherein the first key word is identified as being related to the second key word, when the first keyword and the second keyword comprise a keyword pair, and wherein the key word pair is determined based at least on data from historical conversations;
determine the message and the other message are both associated with the one of the plurality of conversations, wherein the determining comprises determining a relevance value corresponding to a degree of relevance of the message and the other message, wherein the relevance value is determined based at least on a quantity of key word pairs present in the message and the other message, a time interval between the message and the other message, and a probability associated with the keyword pair, and wherein the probability indicates a likelihood that a first message that includes the first key word is relevant to a second message that contains the second key word;
determine the message is to be sent to at least one recipient, wherein the at least one recipient comprises a party participating in the one of the plurality of conversations;
provide, to the sender, a suggestion to send the message to the at least one recipient, when the relevance value is less than a threshold value; and
update, based at least on the message being associated with the one of the plurality of conversations, the data from the historical conversations.

9. The apparatus of claim 8, wherein the data from the historical conversations comprises semantic relations between key words extracted from the historical conversations.

10. The apparatus of claim 9, wherein the key words comprise at least one of a textual word, a series of characters, a plurality of words, a sentence, a sentence fragment, multimedia content, an image, image data, a video frame, video data, a video clip, audio data, audio clip, or an emoticon.

11. The apparatus of claim 8, wherein the apparatus is further configured to at least:
selecting the one of the plurality of conversations; and
comparing a content of the message to the other message to at least determine whether the second key word appears in the other message.

12. The apparatus of claim 8, wherein the apparatus is further configured to at least:
send, to the at least one recipient, the message, when the relevance value is greater than or equal to a predefined threshold value.

13. The apparatus of claim 8, wherein the plurality of conversations includes an instant messaging conversation, an electronic mail conversation, a text messaging conversation, a multimedia messaging service conversation, a short message service conversation, a twitter feed, a microblog, an internet relay chat conversation, an online chat conversation, a chat room conversation, and/or a message thread on a message board.

14. A non-transitory computer-readable storage medium encoded with instructions that when executed by at least one processor, cause operations comprising:
determining a message that is to be sent by a sender, wherein the sender is engaged in a plurality of active messaging conversations;
identifying, in the message, a first key word that is related to a second key word found in another message, wherein the other message was sent in one of the plurality of conversations, wherein the first key word is identified as being related to the second key word, when the first keyword and the second keyword comprise a keyword pair, and wherein the key word pair is determined based at least on data from historical conversations;
determining the message and the other message are both associated with the one of the plurality of conversations, wherein the determining comprises determining a relevance value corresponding to a degree of relevance of the message and the other message, wherein the relevance value is determined based at least on a quantity of key word pairs present in the message and the other message, a time interval between the message and the other message, and a probability associated with the keyword pair, and wherein the probability indicates a likelihood that a first message that includes the first key word is relevant to a second message that contains the second key word;
determining the message is to be sent to at least one recipient, wherein the at least one recipient comprises a party participating in the one of the plurality of conversations;
providing, to the sender, a suggestion to send the message to the at least one recipient, when the relevance value is less than a threshold value; and
updating, based at least on the message being associated with the one of the plurality of conversations, the data from the historical conversations.

* * * * *